United States Patent
Grisenthwaite et al.

(10) Patent No.: US 9,092,215 B2
(45) Date of Patent: Jul. 28, 2015

(54) MAPPING BETWEEN REGISTERS USED BY MULTIPLE INSTRUCTION SETS

(75) Inventors: Richard Roy Grisenthwaite, Nr Royston (GB); David James Seal, Cherry Hinton (GB)

(73) Assignee: ARM Limited, Cambridge (GB)

( * ) Notice: Subject to any disclaimer, the term of this patent is extended or adjusted under 35 U.S.C. 154(b) by 864 days.

(21) Appl. No.: 12/929,865

(22) Filed: Feb. 22, 2011

(65) Prior Publication Data

US 2011/0225397 A1    Sep. 15, 2011

(30) Foreign Application Priority Data

Mar. 15, 2010    (GB) .................................. 1004293.5

(51) Int. Cl.
G06F 15/00 (2006.01)
G06F 9/30 (2006.01)
G06F 9/40 (2006.01)
G06F 9/38 (2006.01)

(52) U.S. Cl.
CPC ........ G06F 9/30112 (2013.01); G06F 9/30123 (2013.01); G06F 9/30138 (2013.01); G06F 9/30174 (2013.01); G06F 9/30189 (2013.01); G06F 9/30196 (2013.01); G06F 9/384 (2013.01); G06F 9/3863 (2013.01)

(58) Field of Classification Search
None
See application file for complete search history.

(56) References Cited

U.S. PATENT DOCUMENTS

| | | | |
|---|---|---|---|
| 4,825,355 A | 4/1989 | Kurakazu et al. | |
| 6,499,046 B1 | 12/2002 | Nguyen et al. | |
| 2003/0126520 A1* | 7/2003 | Knight | 714/100 |
| 2004/0186981 A1 | 9/2004 | Christie et al. | |
| 2005/0015574 A1 | 1/2005 | Huang | |
| 2006/0107076 A1 | 5/2006 | Duncan | |

(Continued)

FOREIGN PATENT DOCUMENTS

| | | |
|---|---|---|
| CN | 1147306 | 4/1997 |
| GB | 2 349 252 | 10/2000 |

(Continued)

OTHER PUBLICATIONS

SuperH (SH) 64-bit RISC Series SH-5 CPU Core, vol. 1: Architecture, Feb. 2002, pp. i-344.*

(Continued)

*Primary Examiner* — George Giroux
(74) *Attorney, Agent, or Firm* — Nixon & Vanderhye P.C.

(57) ABSTRACT

A processor 4 is provided which supports a first instruction set specifying 32-bit architectural registers and a second instruction set specifying 64-bit architectural registers. Each of these instruction sets is presented with its own set of architectural registers for use. The first set of registers presented to the first instruction set has a one-to-one mapping to the second set of registers presented to this second instruction set. The registers which are provided in hardware are 64-bit registers. In some embodiments, when executing program instructions of the first instruction set, only the least significant portion of these 64-bit registers are accessed and manipulated with the remaining most significant portion of the registers being left unaltered. Register specifying fields within instructions of the first instruction set are decoded together with a current exception mode to determine which architectural register to use whereas the second instruction set uses register specifying fields without a dependence upon exception mode to determine which architectural register are to be used.

22 Claims, 8 Drawing Sheets

(56) References Cited

U.S. PATENT DOCUMENTS

2006/0206646 A1\* 9/2006 Shrivastava et al. .......... 710/260
2008/0046697 A1\* 2/2008 Sugure et al. ................. 712/218
2009/0089553 A1 4/2009 Bybell

FOREIGN PATENT DOCUMENTS

TW 200949825 12/2009
WO WO 2011/114125 9/2011

OTHER PUBLICATIONS

SuperH (SH) 64-bit RISC Series SH-5 CPU Core, vol. 3: SHcompact, Feb. 2002, pp. i-276.\*
Iftode et al. (Scylla: A Smart Virtual Machine for Mobile Embedded Systems, Dec. 2000, pp. 41-50).\*
International Preliminary Report on Patentability mailed Sep. 27, 2012 in PCT/GB2011/050306.
Search Report for UK 1004293.5 dated Jul. 14, 2010.
International Search Report and Written Opinion of the International Searching Authority mailed Aug. 2, 2011 in PCT/GB2011/050306.
SuperH, Inc. "SuperH™ (SH) 64-Bit RISC Series, SH-5 CPU Core" Feb. 2002, vol. 1: "Architecture" pp. 13-30, 57, 64, 169, 189-191, vol. 3 "SHcompact" pp. 1-10, 34, 67, 134, 233, 243.
S.B. Furber, "VLSI RISC Architecture and Organization" Jan. 1989, pp. 111-117, 244-250.
Invitation to Pay Additional Fees & Communication Relating to the Results of Partial International Search mailed Apr. 27, 2011 in PCT/GB2011/050306.
M. Schlett et al, "The architecture of the SH-5 links the future and the past" *Electronic Engineering*, Feb. 2000., pp. 22, 24, 26, 29, 31, 33.
IBM "z/Architecture Principles of Operation" Feb. 2009, pp. viii-x, 1-1 to 1-5, 2-3 to 2-4, 4-57 to 4-61, 7-6 to 710.
English translation of Chinese Office Action dated Aug. 20, 2014 in CN 201180014383.2, 15 pages.
Taiwan Office Action and Search Report issued Oct. 14, 2014 in TW 100108781 and English translation, 28 pages.
Japanese Office Action dated Jun. 9, 2014 in JP 2012-557603 and English translation, 39 pages.
SuperH, Inc., "SuperH™ (SH) 64-Bit RISC Series, SH-5 CPU Core, vol. 1: Architecture" Feb. 2002, pp. 1-7, 13-30, 64-65, 189-191.
SuperH, Inc., "SuperH™ (SH) 64-Bit RISC Series, SH-5 CPU Core, vol. 3: SHcompact" Feb. 2002, pp. 1-10, 67-68, 134-135, 233, 243.
T. Onuki et al, "SuperH processor" second edition, Aug. 2000, pp. 98-100, 122-123, 186-193, 204-205.
A. Nakamori, "Interface extra edition TECH I vo. 20 Introduction of Microprocessor/Architecture" first edition, 4/20014, pp. 179-180.
P. Gomes et al, Hitachi and ST Microelectronics Ltd."The SH-5 Architecture" Oct. 1999, pp. 1-13.
M. Schlett et al, "The architecture of the SH-5 links the future and the past" Electronic Engineering, vol. 72, No. 877, Feb. 2000, pp. 22, 24, 26, 29, 31 and 33.
Chinese Second Office Action dated Mar. 23, 2015 in CN 201180014383.2 and English translation, 20 pages.

\* cited by examiner

|   | X0-X7 | X8-X15 | X16-X23 | X24-X30 |
|---|-------|--------|---------|---------|
| 0 | R0    | R8_usr | R14_irq | R8_fiq  |
| 1 | R1    | R9_usr | R13_irq | R9_fiq  |
| 2 | R2    | R10_usr| R14_svc | R10_fiq |
| 3 | R3    | R11_usr| R13_svc | R11_fiq |
| 4 | R4    | R12_usr| R14_abt | R12_fiq |
| 5 | R5    | R13_usr| R13_abt | R13_fiq |
| 6 | R6    | R14_usr| R14_und | R14_fiq |
| 7 | R7    | R13_hyp| R13_und |         |

64-to-32 register mapping

FIG. 9

MAPPING BETWEEN REGISTERS USED BY MULTIPLE INSTRUCTION SETS

This application claims priority to GB Application No. 1004293.5 filed Mar. 15, 2010, the entire contents of each of which are incorporated herein by reference.

BACKGROUND OF THE INVENTION

1. Field of the Invention

This invention relates to the field of data processing systems. More particularly, this invention relates to data processing systems supporting multiple instruction sets and the way in which the registers used by those multiple instruction sets may be provided.

2. Description of the Prior Art

It is known to provide data processing systems that support multiple instruction sets. Some examples of such data processing systems are the processor designs produced by ARM Limited of Cambridge, England which support both the ARM instruction set and the Thumb instruction set. The ARM instructions are encoded in 32-bits and specify 32-bit data processing operations (e.g. ADD, SUB, LDR, STR, etc) performed upon data values held within 32-bit registers. The Thumb instructions are encoded in 16-bits and specify 32-bit data processing operations performed upon 32-bit data values stored within 32-bit registers.

The Neon and VFP architecture extensions designed by ARM Limited respectively provide SIMD and floating point instructions operating upon data values stored within registers having a size specified under program control.

It is desirable when providing a processor to reduce the amount of circuit resource required. The provision of circuit elements to form registers represents one such circuit resource.

SUMMARY OF THE INVENTION

Viewed from one aspect the present invention provides an apparatus for processing data comprising:

a plurality of registers configured to store data values to be processed; processing circuitry coupled to said plurality of registers and configured to perform data processing operations upon data values stored in said plurality of registers;

an instruction decoder coupled to said processing circuitry and responsive to a stream of program instructions to control said processing circuitry to perform said data processing operations; wherein said instruction decoder is responsive to program instructions of a first instruction set to control said processing circuitry to perform said data processing operations using N-bit architectural registers provided by said plurality of registers, where N is a positive integer value;

said instruction decoder is responsive to program instructions of a second instruction set to control said processing circuitry to perform said data processing operations using M-bit architectural registers provided by said plurality of registers, where M is a positive integer value and at least some of said plurality of registers are shared by program instructions of said first instruction set and program instructions of said second instruction set;

said instruction decoder is configured to decode a register specifying field within a program instruction of said first instruction set when determining which of said plurality of registers to access as part of a first set of N-bit architectural registers presented for use by program instructions of said first instruction set;

said instruction decoder is configured to decode a register specifying field within a program instruction of said second instruction set when determining which of said plurality of registers to access as part of a second set of M-bit architectural registers presented for use by program instructions of said second instruction set; and said instruction decoder is configured to provide a first mapping between values of said register specifying field within program instructions of said first instruction set and said plurality of registers and a second mapping between values of said register specifying field within program instructions of said second instruction set and said plurality of registers, said first mapping being different to said second mapping and said first mapping and said second mapping being such that each register of said first set has a predetermined one-to-one mapping to a register of said second set, shares with said register of said second set a shared part of a common register within said plurality of registers, an unshared part of said common register being unaccessible using instructions of said first instruction set, and stores a value that is accessible using a register of said second set.

The present technique recognises that even if the different instruction sets operate upon architectural registers of different widths it is possible for them to share the resource of a plurality of registers. Furthermore, by arranging for a predetermined one-to-one mapping between the register specifiers used by the two instruction sets it is possible for at least one of the instruction sets to access all of the values stored within the registers by the other instruction set. This is beneficial for inter-operation of programs written in the two instruction sets e.g. share data values between programs written using different ones of the two instruction sets. It will be appreciated that an instruction may typically contain more than one register specifying field. Some instructions may also implicitly specify the use of a particular register, e.g. PUSH and POP instructions implicitly specify use of the stack pointer register.

Whilst it is possible that the first set of registers as presented to the first instruction set may differ in number to the second set of registers as presented to the second instruction set, in at least preferred embodiments the first set and the second set include a common number of registers. This helps achieve a high level of reuse of the register resources provided as well as facilitating efficient interoperability between the two instruction sets.

The M-bit architectural registers may be 2N-bit architectural registers.

The plurality of registers may be 2N-bit registers in order to facilitate the manipulation of 2N-bit data values by the second instruction set. In this case the first instruction set may be arranged to access a least significant N-bits of the 2N-bit registers.

The register sizes and data widths can vary but in at least some preferred embodiments, N=32.

A register to be accessed may be completely specified by a register specifying field within a program instruction. Alternatively, additional state, such as a current exception state, may be combined with the value of a register specifying field in order to determine which architectural register is to be accessed. In at least some preferred embodiments of the present invention the first instruction set operates in this way.

When the exception state provides an additional degree of freedom in specifying which architectural register is to be used for a given value of a register specifying field, the group of architectural registers which are accessed with a common value of the register specifying field and different exception states are termed a banked group of registers. Such an arrangement may be useful to assist rapid exception processing.

It will be appreciated that in embodiments using register renaming e.g. to facilitate out-of-order processing, the physical register mapped to an architectural register will change and that at any given point in the processing there may be multiple physical registers corresponding to the same architectural register, but at different points in the program order.

In order to simplify instruction decoding and identifying of a correct architectural register to be used, the mapping employed by the instruction decoder may be such that within a banked group of registers, a value of a least significant bit of the register specifying field within the program instruction of the first instruction set which specifies one of those banked registers is arranged to be a common value with a least significant bit of the register specifying field of a program instruction of the second instruction set which maps to the same architectural register. This simplifies decoding.

A feature of some embodiments which utilise the above arrangement in connection with banked registers is that the instruction decoder is configured to provide the mappings such that for a portion of the registers of the second set corresponding to a sequence of incrementing values of the register specifying field within the program instructions of the second set, corresponding values of the register specifying field within the program instructions of the first instruction set alternate between two values.

The plurality of registers provided may include a null value register storing a predetermined null value when accessed with a program instruction of the second instruction set with the first instruction set having no register mapped to the null value register. Such a null value register can return the null value when read and instructions which specify the null value register as the register to write are interpreted as having the result discarded.

In some embodiments the null value is zero.

In some embodiments when executing program instructions of the first instruction set a program counter register stores a value indicative of a memory address of a program instruction being executed and the program counter register is outside of the first set that is mapped to registers of the second set. Thus, the one-to-one mapping provided by the instruction decoder as discussed above does not include the program counter register.

Viewed from a further aspect the invention provides an apparatus for processing data comprising:

a plurality of register means for storing data values to be processed; processing means for performing data processing operations upon data values stored in said plurality of register means;

instruction decoding means for controlling said processing circuitry to perform said data processing operations in response to a stream of program instructions; wherein said instruction decoding means is responsive to program instructions of a first instruction set to control said processing means to perform said data processing operations using N-bit architectural register means provided by said plurality of register means, where N is a positive integer value;

said instruction decoding means is responsive to program instructions of a second instruction set to control said processing means to perform said data processing operations using M-bit architectural register means provided by said plurality of register means, where M is a positive integer value and at least some of said plurality of register means are shared by program instructions of said first instruction set and program instructions of said second instruction set;

said instruction decoding means is configured to decode a register specifying field within a program instruction of said first instruction set when determining which of said plurality of register means to access as part of a first set of N-bit architectural register means presented for use by program instructions of said first instruction set;

said instruction decoding means is configured to decode a register specifying field within a program instruction of said second instruction set when determining which of said plurality of register means to access as part of a second set of M-bit architectural register means presented for use by program instructions of said second instruction set; and said instruction decoding means is configured to provide a first mapping between values of said register specifying field within program instructions of said first instruction set and said plurality of register means and a second mapping between values of said register specifying field within program instructions of said second instruction set and said plurality of register means, said first mapping being different to said second mapping and said first mapping and said second mapping being such that each register means of said first set has a predetermined one-to-one mapping to a register means of said second set, shares with said register means of said second set a shared part of a common register means within said plurality of register means, an unshared part of said common register means being unaccessible using instructions of said first instruction set, and stores a value that is accessible using a register means of said second set.

Viewed from another aspect the present invention provides an a method of processing data comprising the steps of:

storing data values to be processed in a plurality of registers;

performing data processing operations upon data values stored in said plurality of registers; decoding a stream of program instructions to control said performing of said data processing operations; wherein said decoding is responsive to program instructions of a first instruction set to control said performing of said data processing operations using N-bit architectural registers provided by said plurality of registers, where N is a positive integer value;

said decoding is responsive to program instructions of a second instruction set to control said performing of said data processing operations using M-bit architectural registers provided by said plurality of registers, where M is a positive integer value and at least some of said plurality of registers are shared by program instructions of said first instruction set and program instructions of said second instruction set;

said decoding decodes a register specifying field within a program instruction of said first instruction set when determining which of said plurality of registers to access as part of a first set of N-bit architectural registers presented for use by program instructions of said first instruction set;

said decoding decodes a register specifying field within a program instruction of said second instruction set when determining which of said plurality of registers to access as part of a second set of M-bit architectural registers presented for use by program instructions of said second instruction set; and said decoding provides a first mapping between values of said register specifying field within program instructions of said first instruction set and said plurality of registers and a second mapping between values of said register specifying field within program instructions of said second instruction set and said plurality of registers, said first mapping being different to said second mapping and said first mapping and said second mapping being such that each register of said first set has a predetermined one-to-one mapping to a register of said second set, shares with said register of said second set a shared part of a common register within said plurality of registers, an unshared part of said common register being unaccessible using instructions of said first instruction set, and stores a value that is accessible using a register of said second set.

Viewed from a further aspect the present invention provides an apparatus for processing data comprising:

a plurality of registers configured to store data values to be processed;

processing circuitry coupled to said plurality of registers and configured to perform data processing operations upon data values stored in said plurality of registers;

an instruction decoder coupled to said processing circuitry and responsive to a stream of program instructions to control said processing circuitry to perform said data processing operations; wherein said instruction decoder is responsive to program instructions of a first instruction set to control said processing circuitry to perform said data processing operations using a first set of architectural registers provided by said plurality of registers;

said apparatus when executing program instructions of said first instruction set is configured to operate in a plurality of exception states and said instruction decoder is configured to decode said register specifying field within a program instruction of said first instruction set together with a current exception state of said plurality of exception states when determining which, architectural register to use;

said instruction decoder is responsive to program instructions of a second instruction set to control said processing circuitry to perform said data processing operations using a second set, of architectural registers provided by said plurality of registers and shared with program instructions of said first instruction set; and said instruction decoder is configured to decode a register specifying field within a program instruction of said second instruction set without a dependence upon exception state determining which architectural register to use.

Viewed from a further aspect the invention provides an apparatus for processing data comprising:

a plurality of register means for storing data values to be processed;

processing means for performing data processing operations upon data values stored in said plurality of register means;

instruction decoding means for controlling said processing circuitry to perform said data processing operations in response to a stream of program instructions; wherein said instruction decoder means is responsive to program instructions of a first instruction set to control said processing means to perform said data processing operations using a first set of architectural registers provided by said plurality of register means;

said apparatus when executing program instructions of said first instruction set is configured to operate in a plurality of exception states and said instruction decoder means is configured to decode said register specifying field within a program instruction of said first instruction set together with a current exception state of said plurality of exception states when determining which architectural register to use;

said instruction decoder means is responsive to program instructions of a second instruction set to control said processing means to perform said data processing operations using a second set of architectural registers provided by said plurality of register means and shared with program instructions of said first instruction set; and said instruction decoder means is configured to decode a register specifying field within a program instruction of said second instruction set without a dependence upon exception state when determining which architectural register to use.

Viewed from a further aspect the invention provides an a method of processing data comprising the steps of:

storing data values to be processed in a plurality of registers;

performing data processing operations upon data values stored in said plurality of registers; decoding a stream of program instructions to control said performing of said data processing operations; wherein said decoding is responsive to program instructions of a first instruction set to control said performing of said data processing operations using a first set of architectural registers provided by said plurality of registers;

when executing program instructions of said first instruction set, operating in one of a plurality of exception states and decoding said register specifying field within a program instruction of said first instruction set together with a current exception state of said plurality of exception states to determine which architectural register to use;

said decoding is responsive to program instructions of a second instruction set to control said performing of said data processing operations using a second set of architectural registers provided by said plurality of registers and shared with program instructions of said first instruction set; and said decoding decodes a register specifying field within a program instruction of said second instruction set without dependence upon exception state when determining which architectural register to use.

The above, and other objects, features and advantages of this invention will be apparent from the following detailed description of illustrative embodiments which is to be read in connection with the accompanying drawings.

BRIEF DESCRIPTION OF THE DRAWINGS

FIG. 9 schematically illustrates the mapping between the registers of FIGS. 7 and 8;

DESCRIPTION OF THE EMBODIMENTS

Figure 1:
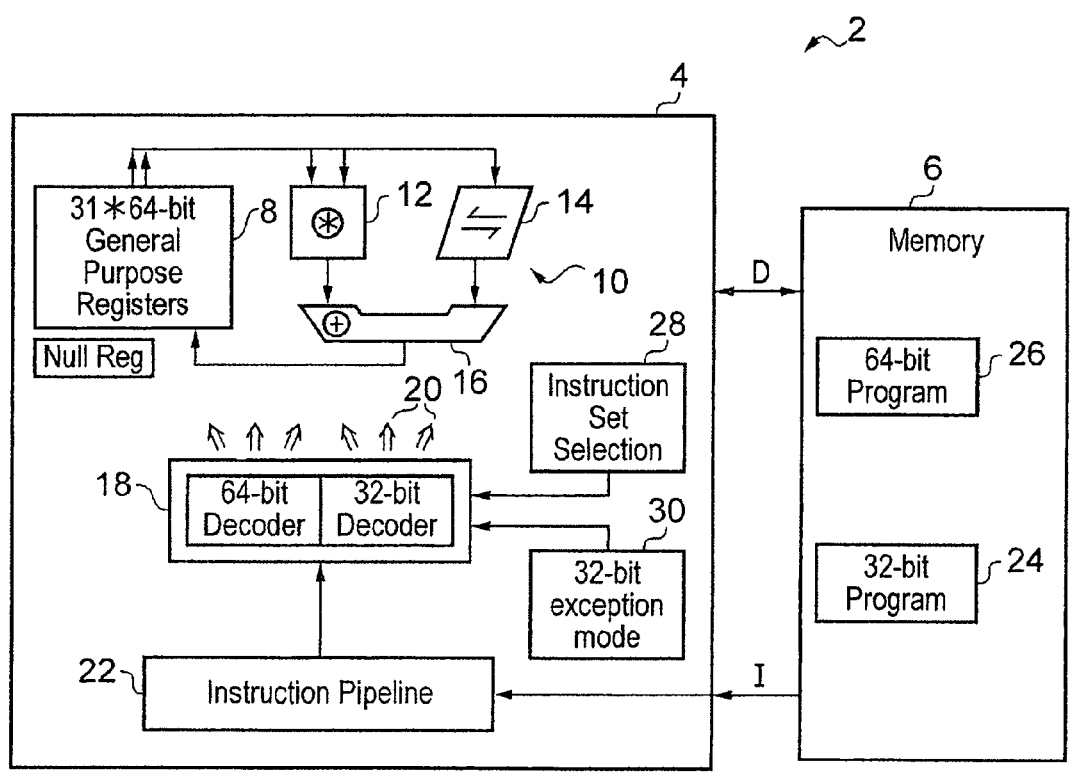
FIG. 1 schematically illustrates a data processing system supporting a first instruction set operating upon 32-bit data values and a second instruction set operating on 64-bit data values.

FIG. 1 schematically illustrates a data processing system 2 including a processor 4 coupled to a memory 6. The processor 4 includes a plurality of registers 8 formed as 31 64-bit general purpose registers plus a null register which always returns a zero value. These are the registers provided by the hardware of the processor 4 in an embodiment that does not use register renaming. In an embodiment using register renaming an architectural register (e.g. a register as specified by an instruction and as considered in the programmer's model) may be mapped to different physical registers and multiple physical registers may simultaneously hold values corresponding to the same architectural register at different times in the program order.

Use of the registers 8 is via a first set of registers (a set of 32-bit architectural registers) presented to a first instruction set which comprises instructions encoded in 32-bits and operating upon 32-bit data values (32-bit instructions) and via a second set of registers (a set of 64-bit architectural registers) presented to a second instruction set which comprises instructions encoded in 32-bits and operating upon 64-bit data values (64-bit instructions). The instructions within both these instruction sets are encoded as using 32-bits, but the width of the data values acted upon by these instruction sets differ.

Processing circuitry 10 is coupled to the plurality of registers 8 and takes the form of a data path including a multiplier 12, a shifter 14 and an adder 16. An instruction decoder 18 (which includes register mapping circuitry) generates control signals 20 in response to program instructions decoded by the instruction decoder 18. These control signals 20 control and configure the processing circuitry 10 as well as controlling accesses to the registers within the plurality of general purpose registers 8. It will be appreciated that the processing circuitry 10 is shown in simplified form to improve clarity and that in practice many more circuit elements may be present.

The data processing system 2 uses state data (which may or may not be user readable) to control whether program instructions are decoded as program instructions of the first instruction set or program instructions of the second instruction set, e.g. a mode bit or mode state may be set to indicate which instruction set is in use. The encoding of the instructions within the different instruction sets may be non-orthogonal in that the same instruction bit pattern may occur in both instruction sets and correspond to different instructions within those instruction sets.

Program instructions to be decoded are fetched into an instruction pipeline 22 from the memory 6 which stores both programs 24 of the first instruction set and programs 26 of the second instruction set. When the program instructions reach the decode stage within the instruction pipeline 22, then they are passed to the instruction decoder 18 for decoding to generate the control signals 20. The instruction decoder 18 is also responsive to a signal from instruction set selection circuitry 28 to indicate which instruction set is currently in use and accordingly whether the program instruction presented for decoding by the instruction pipeline 22 should be decoded as a 32-bit instruction of the first instruction set or a 64-bit instruction of the second instruction set. When the instruction decoder 18 is decoding instructions from the first instruction set (32-bit instructions), then the instruction decoder is also responsive to a signal from 32-bit exception mode circuitry 30 indicating in which mode the processor 4 is currently operating. The current exception mode when executing program instructions of the first instruction set is needed in order to specify which of the registers of the first set of registers presented to the first instruction set is to be used as will be described below.

Figure 2:
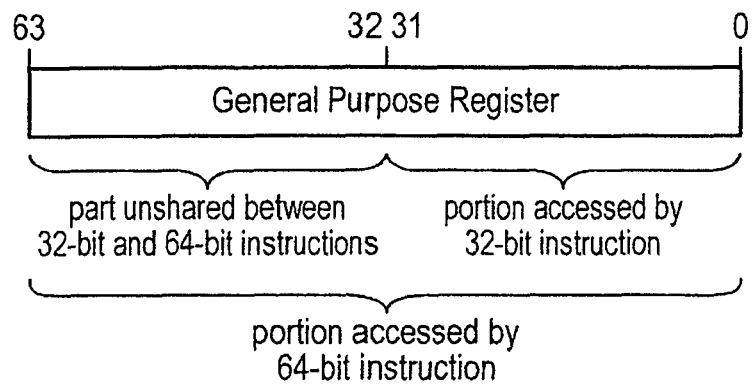
FIG. 2 schematically illustrates a 64-bit general purpose register of the data processing system of FIG. 2.

FIG. 2 illustrates one of the plurality of general purpose registers 8 from FIG. 1. This general purpose register is a 64-bit register. When executing a program instruction of the first instruction set (32-bit instruction), the least significant bit portion of the register of FIG. 2 is accessed and manipulated. In preferred embodiments, the most significant bit portion is left unaltered during such manipulations, although it could be zeroed or set to some undefined value. When the register of FIG. 2 is accessed by a program instruction of the second instruction set, the full 64 bits of the register are utilised. Thus, even though the two instruction sets operate upon different data widths, they can share the use of the physical registers provided in the plurality of registers 8 of FIG. 1. The most significant 32-bits of the register are a part of the register which is unshared between the two instruction sets.

Figure 3:
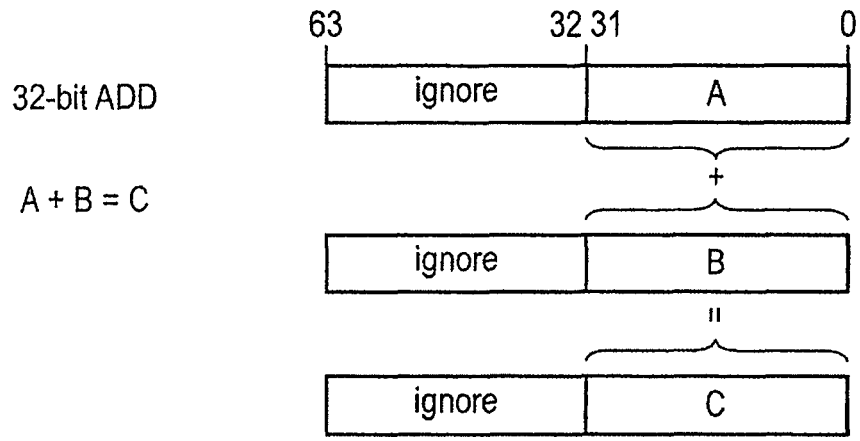
FIG. 3 schematically illustrates the action of a data processing instruction operating upon a 32-bit data processing value using the general purpose register of FIG. 2.

FIG. 3 schematically illustrates the use of the registers in performing an add operation from the first instruction set. As will be seen, the lower portion of each register is utilised to provide either an input operand or the destination for the processing operation performed. The upper portion of the registers is ignored, and, in preferred embodiments, is left unaltered.

Figure 4:
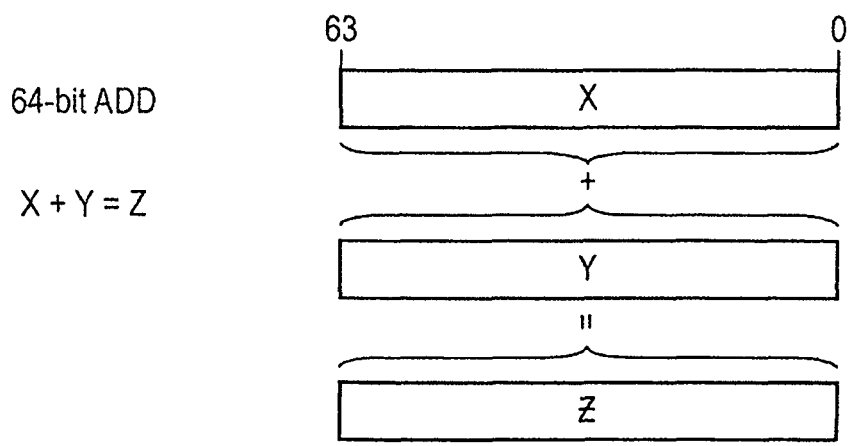
FIG. 4 schematically illustrates the action of a data processing instruction operating upon a 64-bit data processing value using the general purpose register of FIG. 2.

In FIG. 4 an add operation of the second instruction set (64-bit instruction) is illustrated in a similar manner. It will be seen from FIG. 4 that the input operands and the destination in this case all utilise the full width of the register of FIG. 2.

Figure 5:
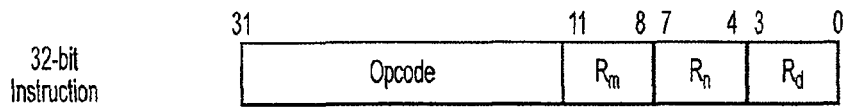
FIG. 5 schematically illustrates an example of an instruction operating on 32-bit data processing values and including register specifying fields.

FIG. 5 schematically illustrates an instruction of the first instruction set (32-bit instruction) including three register specifying fields. These register specifying fields are 4-bit fields allowing 16 different values to be specified by each register specifying field. There are two source register specifying fields illustrated, namely $R_m$ and $R_n$. There is one destination register specifying field illustrated, namely $R_d$. The remainder of the instruction schematically illustrated in FIG. 5 is an opcode used to indicate which data processing manipulation is to be performed. A register specifying field may also be non-contiguous with some bits of the register specifier separated from other bits of the register specifier.

Figure 6:
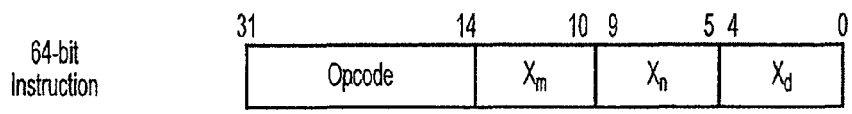
FIG. 6 schematically illustrates an example of an instruction operating on 64-bit data processing values and including register specifying fields.

FIG. 6 is similar to FIG. 5 except that in this case an instruction from the second instruction set (64-bit instruction) is illustrated. In this case the register specifying fields are 5-bit fields allowing up to 32 different values for each register specifying field to be indicated. The source register specifying fields are $X_m$ and $X_n$ with the destination register specifying field being $X_d$.

Figure 7:
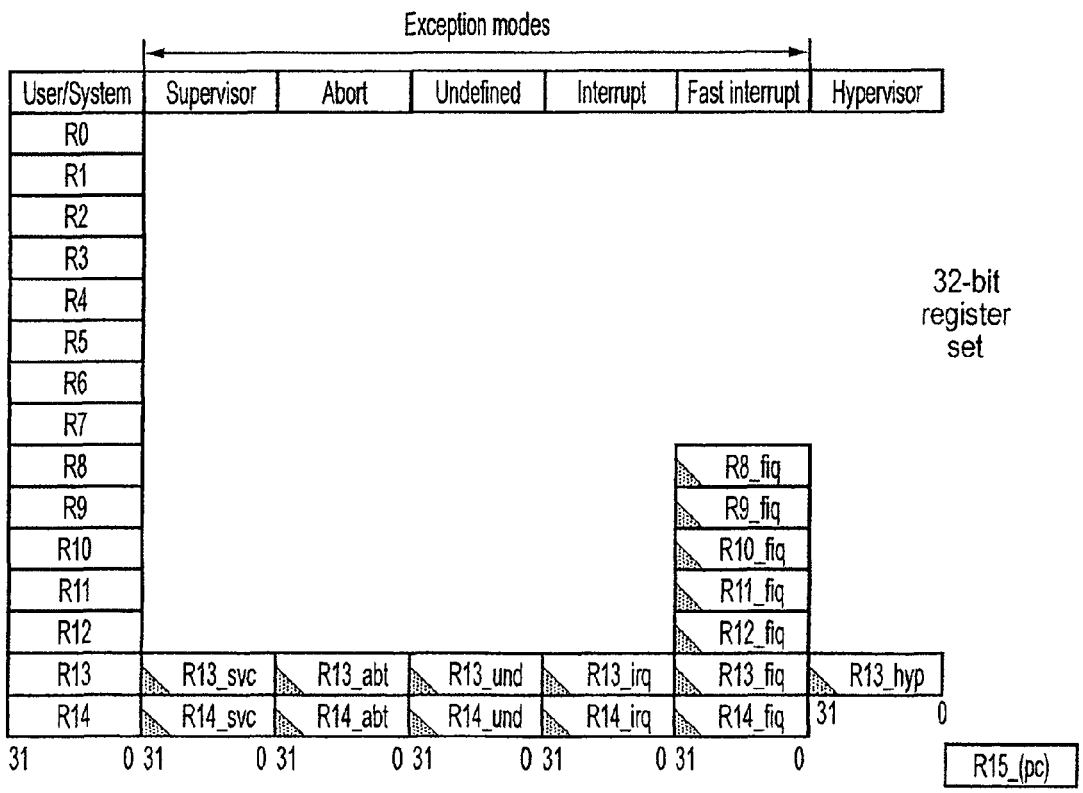
FIG. 7 schematically illustrates the registers presented to the first instruction set of program instructions operating on 32-bit data processing values.

FIG. 7 illustrates the first set of architectural registers as presented to the first instruction set. This is the set of architectural registers presented to the ARM instruction set in the processors designed by ARM Limited of Cambridge, England. The register specifying fields are 4-bit fields allowing values between 0 and 15 to be specified. Register R15 is reserved for use as the program counter. This use of R15 as the program counter is a special purpose use and the program counter does not form one of the first set of architectural registers presented to the ARM instruction set (first instruction set) which is mapped to the second set of architectural registers which are presented to the 64-bit instruction set as discussed below.

As illustrated in FIG. 7, the user and system mode is provided with fifteen general purpose registers R0 to R14. The register specifying field within an instruction as illustrated in FIG. 5 is used to specify which of these registers is to be accessed as part of a data processing operation being performed. It will be appreciated that many data processing operations specify multiple registers to be accessed.

In practice the register R13 is reserved for use as a stack pointer and the register R14 is used as a return address register e.g. for storing return addresses in respect of function calls.

FIG. 7 illustrates that when the processor 4 is operating in one of the exception modes (as indicated to the instruction decoder 18 by the 32-bit exception mode circuitry 30) different architectural registers are provided to the first instruction set when using a particular register specifying value. Thus, as one example, when the register specifying value is "13" there are seven different architectural registers which may be used (before any register renaming). The first of these architectural registers is used in the user or system mode. The remaining six of these architectural registers, which are effectively substituted in place of the architectural register used in the user or system mode, are selected in dependence upon the current exception mode or whether the processor is executing in a hypervisor mode. If the processor 4 is executing in a hypervisor mode, then this is indicated by a signal input to the instruction decoder 18 as illustrated in FIG. 1.

The six architectural registers which can substitute for the R13 register of the user or system mode are as a group referred to as banked exception registers. It will be seen that different architectural registers have different numbers of banked equivalents and not all architectural registers do have a banked equivalent. The provision of these banked registers may facilitate faster exception processing in some circumstances.

Figure 8:
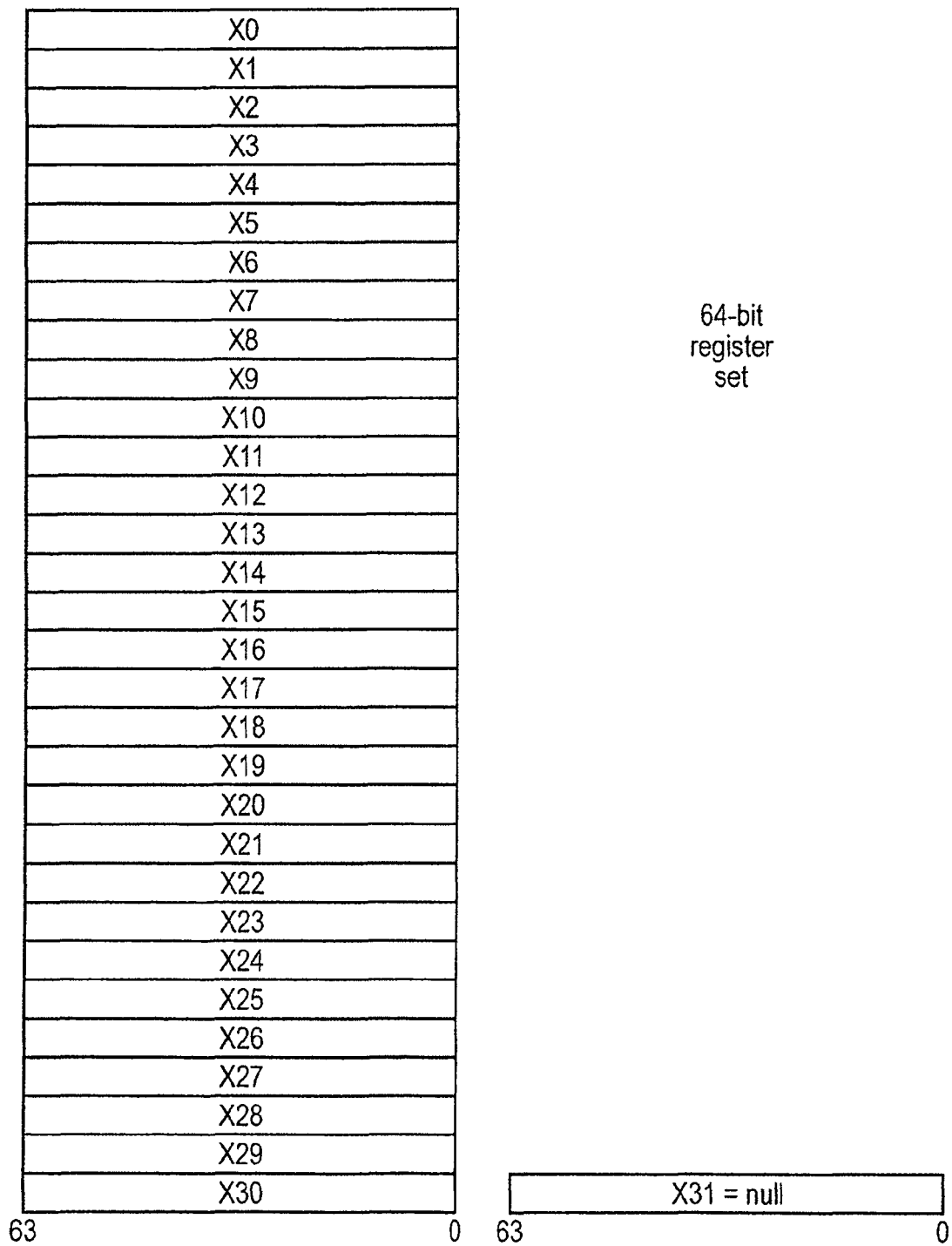
FIG. 8 schematically illustrates the registers presented to the second instruction set operating on 64-bit data processing values.

FIG. 8 schematically illustrates the second set of architectural registers as presented to the second instruction set. This second set of architectural registers has a simplified structure compared to the first set of architectural registers illustrated in FIG. 7. The second set of architectural registers comprises thirty one general purpose registers each being a 64-bit register. These are denoted X0 to X30. The five bit register specifying fields illustrated in FIG. 6 are used to specify which of these architectural registers is to be accessed. The architectural registers illustrated in FIG. 8 are accessed as 64-bit registers with all 64 bits being manipulated by the data processing operation specified. In contrast, the architectural registers of FIG. 7 are accessed as 32-bit registers even though the underlying physical register is a 64-bit register as illustrated in FIG. 2.

Also illustrated in FIG. 8 is a null register X31 which stores a null value (e.g. 0). Whenever this null register is read then the null value is returned. Whenever this register is written, then the null value remains stored within the null register irrespective of the attempted write. There is no equivalent of the null register of FIG. 8 in the architectural registers presented to the first instruction set as illustrated in FIG. 7. Accordingly, the null register is not included within the second set of architectural registers which are subject to the one-to-one mapping between registers of the first set and the second set.

FIG. 9 illustrates the mapping between the registers of the first set and the registers of the second set. As illustrated, registers X0 to X7 respectively access the same 64-bit registers as do registers R0 to R7. This continues for the further registers with the mapping as illustrated. A feature to note is that for the registers R13 and R14, the least significant bit of the register specifier used in the first instruction set corresponds to the least significant bit of the register specifier which is used for the corresponding register in the second instruction set. This simplifies decoding of the register specifier and the exception mode to select the physical register. A further feature of this mapping is that the incrementing sequence of register specifiers for the registers X16 to X23 corresponds to register values in the first instruction set of R14 and R13 which alternate in value.

It will be seen from FIG. 9 that there is a one-to-one mapping between the first set of registers presented to the first instruction set and the second set of registers presented to the second instruction set. All of the registers of the first set are accessible to program instructions of the second instruction set. This facilitates interoperability between the instruction sets. Thus, whilst executing instructions of the first instruction set certain values held within the bank registers may not be available to the program instructions as the current exception mode does not map those banked registers into use. However, a switch to executing instructions of the second instruction set maps all of the registers of the first set to registers of the second set such that they are all accessible independently of any current mode.

Figure 10:
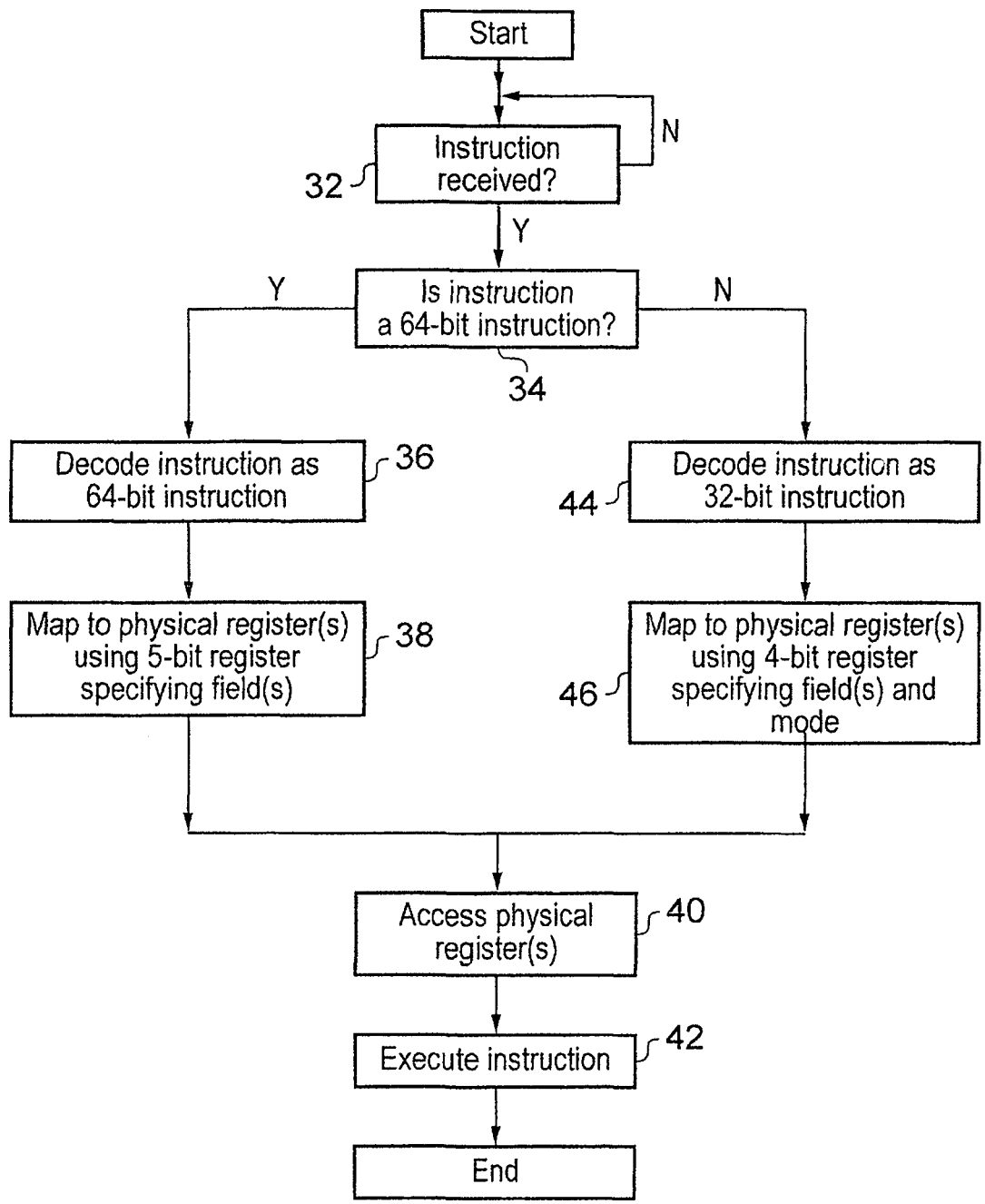
FIG. 10 is a flow diagram schematically illustrating decoding of instructions.

FIG. 10 is a flow diagram schematically illustrating the operation of the instruction decoder 18. At step 32 processing waits until an instruction is received. At step 34 a determination is made as to whether or not the instruction is from the second instruction set, namely that the instruction is a 64-bit instruction. If the instruction is a 64-bit instruction, then step 36 decodes the 64-bit instruction. Step 38 maps the registers to be used to the register specifying fields which are 5-bit fields. Step 40 then accesses the registers specified by the 5-bit register specifying fields. Step 42 executes the instruction.

If the determination at step 34 is that the instruction is not a 64-bit instruction, then step 44 decodes the instruction as a 32-bit instruction. Step 46 maps the registers to be used using the 4-bit register specifying fields and the current exception mode (and hypervisor status) as previously discussed. Steps 40 and 42 then access the registers which have been identified and execute the instruction.

Figure 11:
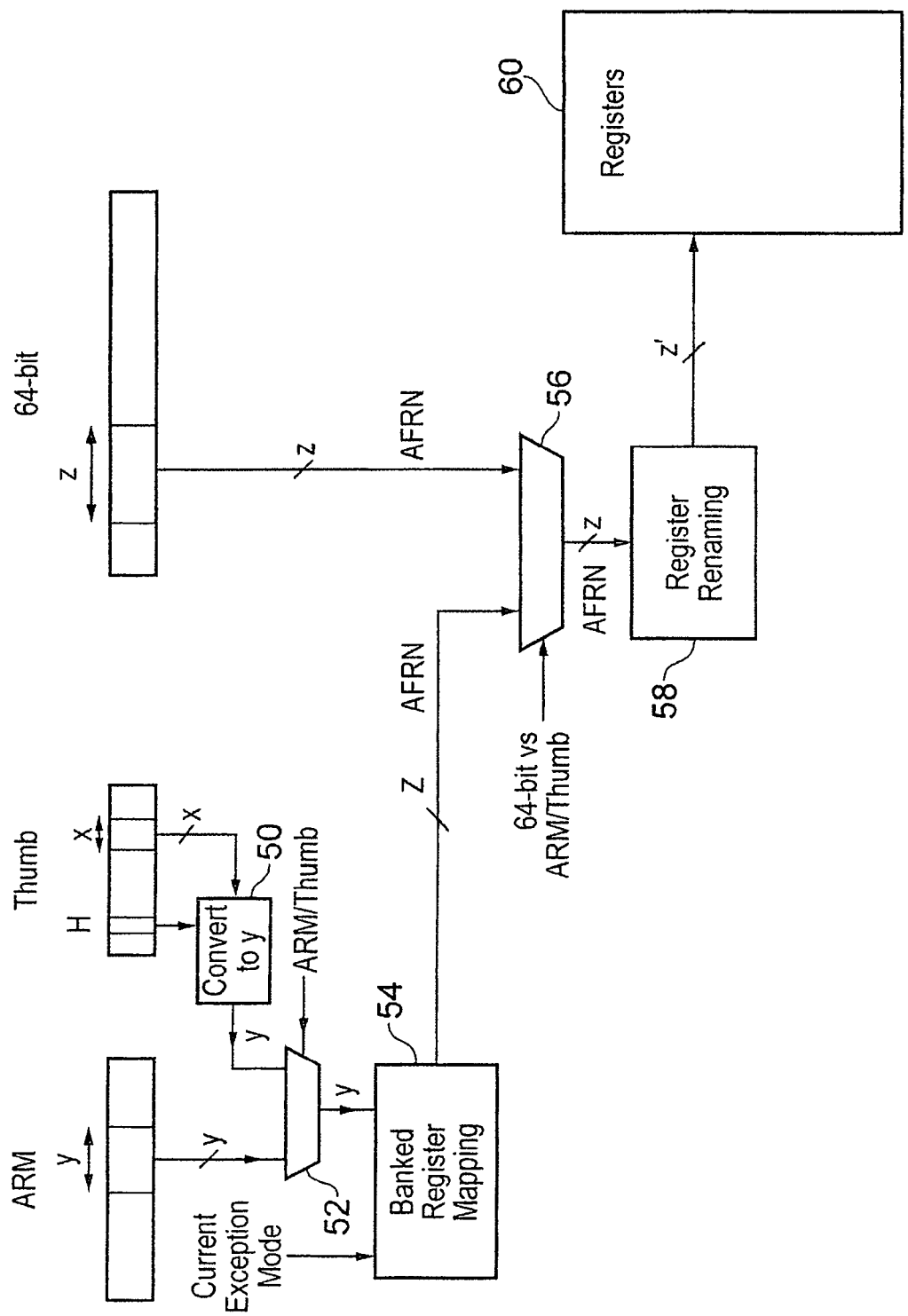
FIG. 11 schematically illustrates decoding of register specifying fields of program instructions from different instruction sets.

FIG. 11 schematically illustrates the decoding of program instructions from different instruction sets as performed by part of the instruction decoder 18. These instruction sets are an ARM instruction set encoded as 32-bit instructions manipulating 32-bit data values, a Thumb instruction set encoded as 16-bit instructions manipulating 32-bit data values and a 64-bit instruction set encoded as 32-bit instructions manipulating 64-bit data values. The ARM instructions include register fields of y-bits in length, e.g. 4 bits allowing 16 different architectural registers to be specified. The Thumb instructions use register specifying fields of x bits augmented by an H bit which is used for some instructions, e.g. 3 bits allowing 8 architectural registers to be normally addressed and augmented by the H bit permitting for some instructions 16 architectural registers to be addressed. The 64-bit instructions use a z-bit register specifying field, e.g. a 5 bit register specifying field allowing 32 architectural registers to be addressed.

State within the processor 4 controls which instruction set is currently in use. This state may be programmer visible in some embodiments. The instruction set currently in use may be selected by using instruction set selecting instructions, which may sometimes be associated with branch operations, e.g. a branch with a switch of instruction set. The instruction encodings of the different instruction sets are non-orthogonal with the consequence that the same 32-bit pattern specifying an ARM instruction may correspond to a different instruction within the 64-bit instruction set. The correct decoding of this 32-bit pattern may be performed in combination with the state identifying which instruction set is currently in use.

The decoding of the register specifying field of a Thumb instruction takes place by first converting the x bits and the H bit into a y-bit field using conversion circuitry 50. This y-bit field corresponds to the y-bit field in an ARM instruction. A multiplexer 52 then selects in dependence upon which of the ARM or Thumb instruction sets is currently in use to pass either the y-bit register specifying field from the conversion circuitry 50 or the y bit specifying field read from an ARM instruction on to bank register mapping circuitry 54.

As previously described in connection with FIG. 7, the ARM instruction set (and also the Thumb instruction set) provide banked registers. In order to access a particular architectural register both the y-bit register specifying field and the current exception mode need to be decoded by the banked register mapping circuitry 54 to generate a z-bit architecturally flat register number (AFRN). A given y-bit register specifying field generated from an ARM instruction or a Thumb instruction may, for example specify register R13. However, as illustrated in FIG. 7, there are seven architectural registers each corresponding to this y-bit field and the current exception mode is used to select between these seven different architectural registers in order to generate the corresponding architecturally flat register number.

The 64-bit instruction set does not use banked registers. Accordingly, the z-bit register specifying field may be directly used as an architecturally flat register number to specify the architectural register to be accessed. A multiplexer 56 selects between either the architecturally flat register number read from a 64-bit instruction or the architecturally flat register number generated by the banked register mapping circuitry 54 to provide an architecturally flat register number which is passed forward onto register renaming circuitry 58. Register renaming circuitry can perform register renaming operations in accordance with known out-of-order processing techniques in order to generate a register specifier z' which is used to address a physical register within a plurality of registers 60.

The arrangement of FIG. 11 permits the register renaming circuitry 58 to be shared between the different instruction sets as well as the sharing of the plurality of registers 60. The common generation of the architecturally flat register number simplifies the decoding and the sharing of the plurality of registers 60. The register renaming circuitry 58 need not be provided in all embodiments.

Figure 12:
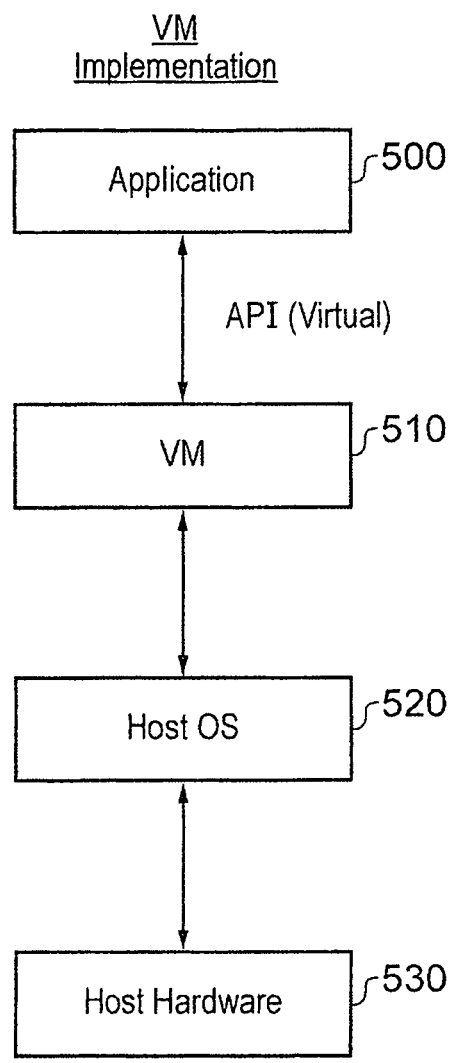
FIG. 12 schematically illustrates a virtual machine implementation.

FIG. 12 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:

a plurality of registers configured to store data values to be processed;

processing circuitry coupled to said plurality of registers and configured to perform data processing operations upon data values stored in said plurality of registers;

an instruction decoder coupled to said processing circuitry and responsive to a stream of program instructions to control said processing circuitry to perform said data processing operations; wherein said instruction decoder is responsive to program instructions of a first instruction set to control said processing circuitry to perform said data processing operations using N-bit architectural registers provided by said plurality of registers, where N is a positive integer value;

said instruction decoder is responsive to program instructions of a second instruction set to control said processing circuitry to perform said data processing operations using M-bit architectural registers provided by said plurality of registers, where M is a positive integer value different from N and at least some of said plurality of registers are shared by program instructions of said first instruction set and program instructions of said second instruction set;

said instruction decoder is configured to decode a register specifying field within a program instruction of said first instruction set when determining which of said plurality of registers to access as part of a first set of N-bit architectural registers presented for use by program instructions of said first instruction set;

said instruction decoder is configured to decode a register specifying field within a program instruction of said second instruction set when determining which of said plurality of registers to access as part of a second set of M-bit architectural registers presented for use by program instructions of said second instruction set; and said instruction decoder is configured to provide a first mapping between values of said register specifying field within program instructions of said first instruction set and said plurality of registers and a second mapping between values of said register specifying field within program instructions of said second instruction set and said plurality of registers, said first mapping is different from said second mapping and said first mapping and said second mapping are configured so each register of said first set has a predetermined one-to-one mapping to a register of said second set, shares with said register of said second set a shared part of a common register within said plurality of registers, an unshared part of said common register being unaccessible using instructions of said first instruction set, and stores a value that is accessible using a register of said second set, wherein said apparatus when executing program instructions of said first instruction set is configured to operate in a plurality of exception states and said instruction decoder is configured to decode said register specifying field within a program instruction of said first instruction set together with a current exception state of said plurality of exception states when determining which of said plurality of registers to access and a group of registers within said first set corresponding to a common value of said register specifying field within said program instruction of said first instruction set and different exception states are a banked group of registers, wherein within said banked group of registers a value of a least significant bit of said register specifying field within said program instruction of said first instruction set is common with a value of a least significant bit of said register specifying field within said program instruction of said second instruction set, wherein said instruction decoder is configured to provide said first mapping and said second mapping wherein, for a portion of said registers of said second set corresponding to a sequence of incrementing values of said register specifying field within said program instruction of said second instruction set, corresponding values of said register specifying field within said program instruction of said first instruction set alternate between two values.

2. Apparatus as claimed in claim 1, wherein M=2N.

3. Apparatus as claimed in claim 1, wherein said first set and said second set include a common number of registers.

4. Apparatus as claimed in claim 1, wherein said plurality of registers comprises a plurality of M-bit registers and program instructions of said first instruction set access a least significant N-bits of said M-bit registers.

5. Apparatus as claimed in claim 1, wherein N=32.

6. Apparatus as claimed in claim 1, wherein said plurality of registers include a null value register storing a predetermined null value when accessed with a program instruction of said second instruction set.

7. Apparatus as claimed in claim 6, wherein said first set of registers has no architectural register mapped to said null value register.

8. Apparatus as claimed in claim 1, wherein, when executing program instructions of said first instruction set, a program counter register stores a value indicative of a memory address of a program instruction being executed and said program counter register is outside said first set that are mapped to registers of said second set.

9. Apparatus as claimed in claim 1, wherein when said common register is accessed by a program instruction of said first instruction set, said unshared part is one of zeroed, unaltered and set to an undefined value.

10. Apparatus for processing data comprising:
a plurality of register means for storing data values to be processed;
processing means for performing data processing operations upon data values stored in said plurality of register means;
instruction decoding means for controlling said processing means to perform said data processing operations in response to a stream of program instructions; wherein
said instruction decoding means is responsive to program instructions of a first instruction set to control said processing means to perform said data processing operations using N-bit architectural register means provided by said plurality of register means, where N is a positive integer value;
said instruction decoding means is responsive to program instructions of a second instruction set to control said processing means to perform said data processing operations using M-bit architectural register means provided by said plurality of register means, where M is a positive integer value different from N and at least some of said plurality of register means are shared by program instructions of said first instruction set and program instructions of said second instruction set;
said instruction decoding means is configured to decode a register specifying field within a program instruction of said first instruction set when determining which of said plurality of register means to access as part of a first set of N-bit architectural register means presented for use by program instructions of said first instruction set;
said instruction decoding means is configured to decode a register specifying field within a program instruction of said second instruction set when determining which of said plurality of register means to access as part of a second set of M-bit architectural register means presented for use by program instructions of said second instruction set; and
said instruction decoding means is configured to provide a first mapping between values of said register specifying field within program instructions of said first instruction set and said plurality of register means and a second mapping between values of said register specifying field within program instructions of said second instruction set and said plurality of register means, said first mapping is different from said second mapping and said first mapping and said second mapping are configured so each register means of said first set has a predetermined one-to-one mapping to a register means of said second set, shares with said register means of said second set a shared part of a common register means within said plurality of register means, an unshared part of said common register means being unaccessible using instructions of said first instruction set, and stores a value that is accessible using a register means of said second set, wherein said apparatus when executing program instructions of said first instruction set is configured to operate in a plurality of exception states and said instruction decoder is configured to decode said register specifying field within a program instruction of said first instruction set together with a current exception state of said plurality of exception states when determining which of said plurality of registers to access and a group of registers within said first set corresponding to a common value of said register specifying field within said program instruction of said first instruction set and different exception states are a banked group of registers, wherein within said banked group of registers a value of a least significant bit of said register specifying field within said program instruction of said first instruction set is common with a value of a least significant bit of said register specifying field within said program instruction of said second instruction set, wherein said instruction decoder is configured to provide said first mapping and said second mapping wherein, for a portion of said registers of said second set corresponding to a sequence of incrementing values of said register specifying field within said program instruction of said second instruction set, corresponding values of said register specifying field within said program instruction of said first instruction set alternate between two values.

11. A method of processing data comprising the steps of:
storing data values to be processed in a plurality of registers;
performing data processing operations upon data values stored in said plurality of registers;
decoding a stream of program instructions to control said performing of said data processing operations; wherein said decoding is responsive to program instructions of a first instruction set to control said performing of said data processing operations using N-bit architectural registers provided by said plurality of registers, where N is a positive integer value;

said decoding is responsive to program instructions of a second instruction set to control said performing of said data processing operations using M-bit architectural registers provided by said plurality of registers, where M is a positive integer value different from N and at least some of said plurality of registers are shared by program instructions of said first instruction set and program instructions of said second instruction set;

said decoding decodes a register specifying field within a program instruction of said first instruction set when determining which of said plurality of registers to access as part of a first set of N-bit architectural registers presented for use by program instructions of said first instruction set;

said decoding decodes a register specifying field within a program instruction of said second instruction set when determining which of said plurality of registers to access as part of a second set of M-bit architectural registers presented for use by program instructions of said second instruction set; and said decoding provides a first mapping between values of said register specifying field within program instructions of said first instruction set and said plurality of registers and a second mapping between values of said register specifying field within program instructions of said second instruction set and said plurality of registers, said first mapping is different from said second mapping and said first mapping and said second mapping configured so each register of said first set has a predetermined one-to-one mapping to a register of said second set, shares with said register of said second set a shared part of a common register within said plurality of registers, an unshared part of said common register being unaccessible using instructions of said first instruction set, and stores a value that is accessible using a register of said second set, wherein when executing program instructions of said first instruction set, operating in one of a plurality of exception states and said decoding decodes said register specifying field within a program instruction of said first instruction set together with a current exception state of said plurality of exception states when determining which of said plurality of registers to access, and a group of registers within said first set corresponding to a common value of said register specifying field within said program instruction of said first instruction set and different exception states being a banked group of registers, wherein within said banked group of registers a value of a least significant bit of said register specifying field within said program instruction of said first instruction set is common with a value of a least significant bit of said register specifying field within said program instruction of said second instruction set, wherein said decoding provides said first mapping and said second mapping wherein, for a portion of said registers of said second set corresponding to a sequence of incrementing values of said register specifying field within said program instruction of said second instruction set, corresponding values of said register specifying field within said program instruction of said first instruction set alternate between two values.

12. A method as claimed in claim 11, wherein M=2N.

13. A method as claimed in claim 11, wherein said first set and said second set include a common number of registers.

14. A method as claimed in claim 11, wherein said plurality of registers comprises a plurality of M-bit registers and program instructions of said first instruction set access a least significant N-bits of said M-bit registers.

15. A method as claimed in claim 11, wherein N=32.

16. A method as claimed in claim 11, wherein said plurality of registers include a null value register storing a predetermined null value when accessed with a program instruction of said second instruction set.

17. A method as claimed in claim 16, wherein said first set of registers has no architectural register mapped to said null value register.

18. A method as claimed in claim 11, wherein, when executing program instructions of said first instruction set, a program counter register stores a value indicative of a memory address of a program instruction being executed and said program counter register is outside said first set of registers that are mapped to registers of said second set.

19. A method as claimed in claim 11 wherein when said common register is accessed by a program instruction of said first instruction set, said unshared part is one of zeroed, unaltered and set to an undefined value.

20. A data processing apparatus executing a virtual machine computer program, said apparatus configured to provide an instruction environment corresponding to the apparatus of claim 1.

21. Apparatus as claimed in claim 1, wherein said instruction decoder is configured to provide said mapping such that for a portion of said registers of said second set corresponding to a sequence of incrementing register numbers of said register specifying field within said program instruction of said second instruction set, corresponding register numbers of said register specifying field within said program instruction of said first instruction set alternate between two values.

22. Apparatus as claimed in claim 1, wherein each of said two values corresponds to a different banked group of registers.

* * * * *